United States Patent
Hack

(10) Patent No.: US 7,334,142 B2
(45) Date of Patent: Feb. 19, 2008

(54) REDUCING POWER CONSUMPTION IN A LOGICALLY PARTITIONED DATA PROCESSING SYSTEM WITH OPERATING SYSTEM CALL THAT INDICATES A SELECTED PROCESSOR IS UNNEEDED FOR A PERIOD OF TIME

(75) Inventor: Mark Elliott Hack, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 10/763,094

(22) Filed: Jan. 22, 2004

(65) Prior Publication Data

US 2005/0166074 A1   Jul. 28, 2005

(51) Int. Cl.
*G06F 1/32* (2006.01)
(52) U.S. Cl. ........................... 713/320; 718/102
(58) Field of Classification Search ............. 713/100, 713/320; 718/102
See application file for complete search history.

(56) References Cited

U.S. PATENT DOCUMENTS

| | | | |
|---|---|---|---|
| 5,630,110 A | 5/1997 | Mote, Jr. | |
| 5,974,557 A | 10/1999 | Thomas et al. | |
| 6,718,474 B1 | 4/2004 | Somers et al. | |
| 6,901,522 B2 * | 5/2005 | Buch | 713/320 |
| 6,918,052 B2 * | 7/2005 | Bouchier et al. | 714/4 |
| 7,036,009 B2 * | 4/2006 | Hiramoto | 713/100 |
| 7,137,117 B2 * | 11/2006 | Ginsberg | 718/102 |
| 2002/0016812 A1 | 2/2002 | Uchishiba et al. | |
| 2002/0156824 A1 | 10/2002 | Armstrong et al. | |
| 2003/0217088 A1 | 11/2003 | Takamoto | |
| 2004/0107369 A1 | 6/2004 | Cooper et al. | |
| 2004/0153749 A1 | 8/2004 | Schwarm et al. | |
| 2005/0049729 A1 | 3/2005 | Culbert et al. | |
| 2005/0125580 A1 | 6/2005 | Madukkarumukumana et al. | |

FOREIGN PATENT DOCUMENTS

KR    2003-0094422    12/2003

* cited by examiner

*Primary Examiner*—Chun Cao
*Assistant Examiner*—Albert Wang
(74) *Attorney, Agent, or Firm*—Duke W. Yee; Libby Z. Handelsman; Wayne P. Bailey

(57) ABSTRACT

A method, apparatus, and computer instructions for managing a set of processors. A call from an operating system is received. The call indicates that a selected processor in the set of processors is unneeded for a period of time. In response to receiving this call, the operation of the selected processor is altered to reduce power usage during the period of time.

6 Claims, 3 Drawing Sheets

REDUCING POWER CONSUMPTION IN A LOGICALLY PARTITIONED DATA PROCESSING SYSTEM WITH OPERATING SYSTEM CALL THAT INDICATES A SELECTED PROCESSOR IS UNNEEDED FOR A PERIOD OF TIME

CROSS REFERENCE TO RELATED APPLICATIONS

The present invention is related to an application entitled Method and Apparatus for Managing Power and Thermal Alerts Transparently to an Operating System in a Data Processing System with Increased Granularity in Reducing Power Usage and Thermal Generation, Ser. No. 10/763,095, filed even date hereof, assigned to the same assignee, and incorporated herein by reference.

BACKGROUND OF THE INVENTION

1. Technical Field

The present invention relates generally to an improved data processing system and in particular to a method and apparatus for processing data. Still more particularly, the present invention provides a method, apparatus, and computer instructions for reducing power consumption in a logical partitioned data processing system.

2. Description of Related Art

Data processing systems are becoming increasingly powerful with the amount of processing power that is provided to users. One increase in processing power comes from the use of faster processors. Another increase in processing power is provided through data processing systems that have multiple processors.

In these types of systems, multiple processors are used to perform different tasks. In handling multiple tasks, processing time for the threads for the different tasks may be divided for the processors. In a symmetric multiprocessing system (SMP), multiple processes can run on any available processor and the threads of a single process can run on different processors at the same time. All of the processors may be automatically used to run any of the threads present in the system. Further, threads may be executed in parallel by the different processors. As a result, a multithreaded application may run multiple threads simultaneously such that more tasks are completed in less time.

As the number of processors increase and the speed of these types of multiprocessor data processing systems increase, power consumption and heat generation become more prevalent problems. For example, the amount of heat generated by the processor increases as the clock frequency used by the processor increases. The amount of heat also goes up as more processors are added or included in a multiprocessor data processing system.

In addressing these problems, cooling systems and reducing the frequency at which the processors operate are techniques currently used. Cooling systems are often expensive and subject to failure. These types of systems only address thermal issues and do not address the issue of power consumption. Reducing the frequency of clock cycles for the processors in a data processing system requires exposure of specific interfaces to the operating system, which implies that the power reduction method is not transparent and can not be applied without operating system modifications.

Therefore, it would be advantageous to have an improved method, apparatus, and computer instructions for reducing power consumption in a data processing system.

SUMMARY OF THE INVENTION

The present invention provides a method, apparatus, and computer instructions for managing a set of processors. A call from an operating system is received. The call indicates that a selected processor in the set of processors is unneeded for a period of time. In response to receiving this call, the operation of the selected processor is altered to reduce power usage during the period of time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
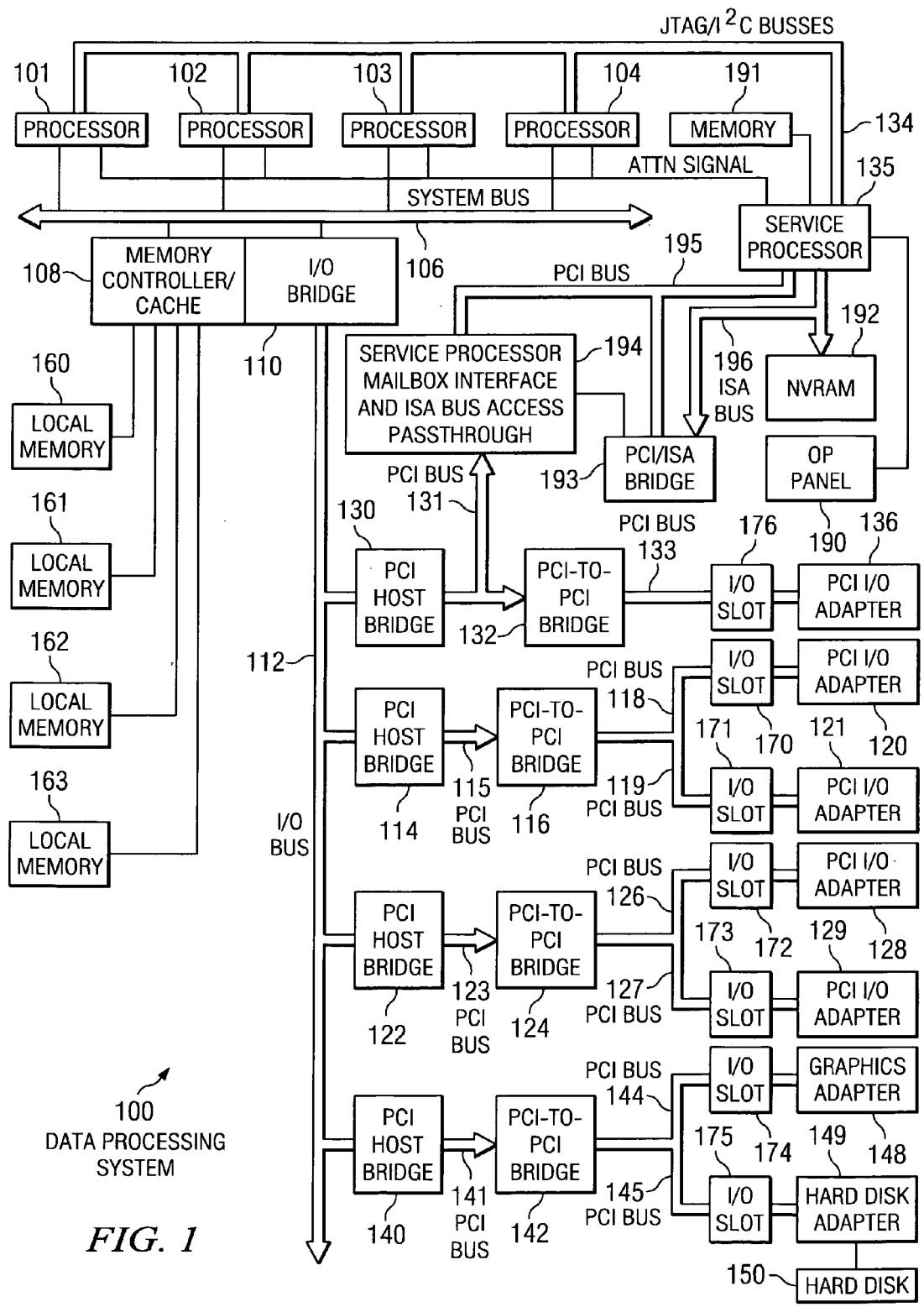
FIG. 1 is a block diagram of a data processing system in which the present invention may be implemented.

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc., are often partitioned and used as logical partitioned (LPAR) data processing systems. A logical partitioned functionality within a data processing system allows multiple copies of a single operating system or multiple heterogeneous operating systems to be simultaneously run on a single data processing system platform. The present invention may be implemented in these types of LPAR data processing systems to reduce power usage without requiring exposure of specific interfaces to the operating systems.

A partition, within which an operating system image runs, is assigned a non-overlapping subset of the platforms resources. The platform's allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocatable resources within the platform. With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

The present invention provides a method, apparatus, and computer instructions for managing power consumption in a multi-processor system, such as an LPAR data processing system, that includes software for managing multiple partitions. Calls may be implemented within the software used to manage partitions to reduce power usage of selected processors within an LPAR data processing system. In the illustrative examples, power usage of a processor is reduced when the software for managing multiple partitions receives an indication that a processor is being ceded or is unneeded for some period of time. This indication may be identified through a call or message received from an operating system.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
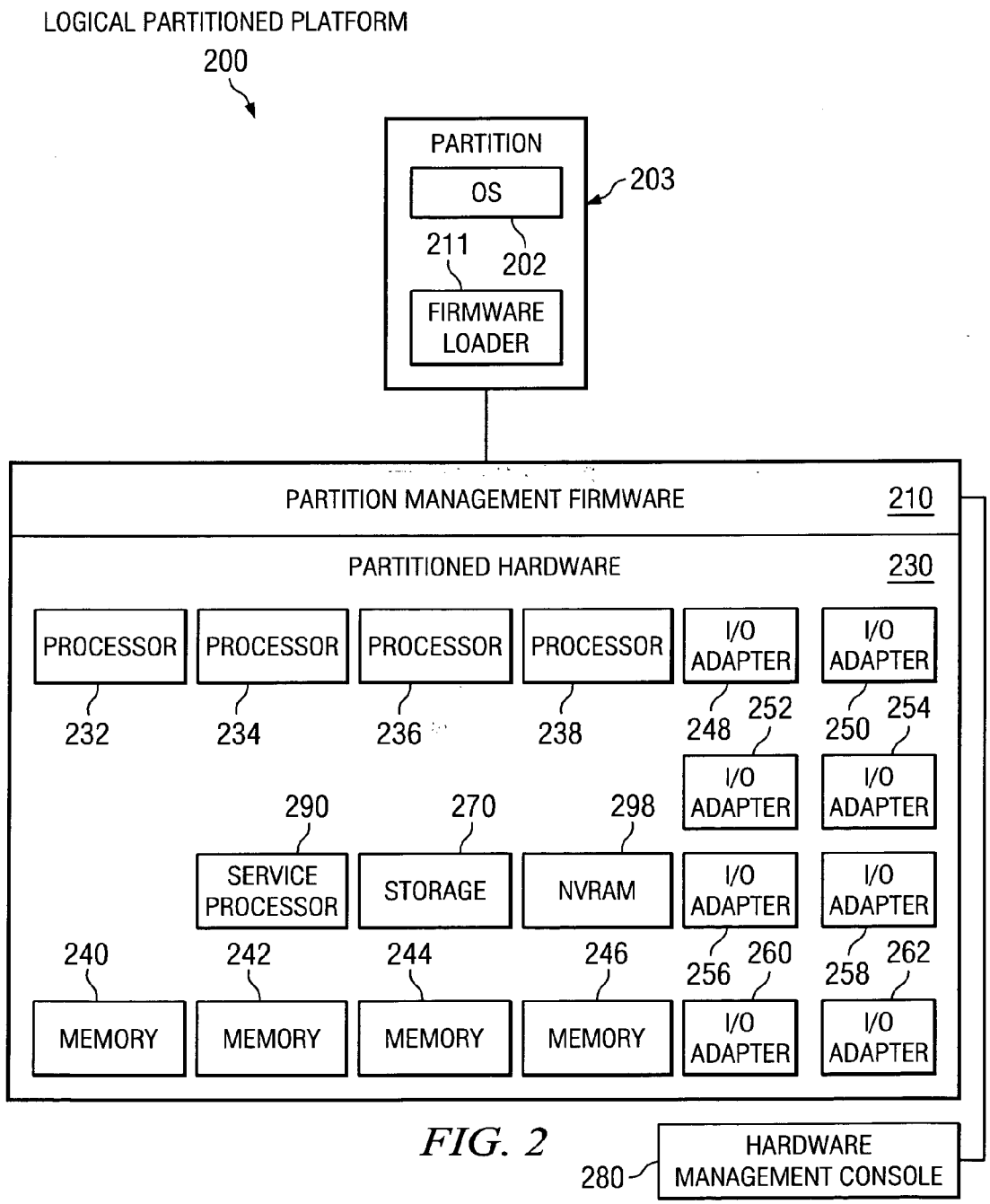
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating system 202, and partition management firmware 210. Typically, logical partitioned platform 200 contains a number of operating systems in addition to operating system 202. In these illustrative examples, the mechanism of the present invention is described with respect to a single operating system in a single partition. Of course, the present invention also may be implemented in a logical partitioned platform containing multiple operating systems in multiple partitions. When multiple operating systems are used, these operating systems may be multiple copies of a single operating system or multiple heterogeneous operating systems simultaneously run on logical partitioned platform 200.

In these illustrative examples, operating system 202 may be implemented using OS/400, which is designed to interface with open firmware, such as a hypervisor, which is available from International Business Machines Corporation. Operating system 202, is located in a single partition, partition 203. Additionally, partition 203 includes firmware loader 211. Firmware loader 211 may be implemented using IEEE-1275 Standard Open Firmware and runtime abstraction software (RTAS), which is available from International Business Machines Corporation. When partition 203 is instantiated, a copy of the open firmware is loaded into partition 203 by the hypervisor's partition manager. The processors associated or assigned to partition 203 are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 are assigned to partition 203 within logical partitioned platform 200. If multiple partitions are present, different components within partitioned hardware 230 may be assigned to different partitions.

Partition management firmware (hypervisor) 210 performs a number of functions and services for partition 203 in logical partitioned platform 200. Partition management firmware 210 is a firmware implemented virtual machine identical to the underlying hardware. Hypervisor software is a type of partition management firmware, which is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, partition management firmware 210 allows the simultaneous execution of independent OS images by virtualizing all the hardware resources of logical partitioned platform 200.

Operations of the different partitions may be controlled through a hardware management console, such as hardware management console 280. Hardware management console 280 is a separate data processing system from which a system administrator may perform various functions including reallocation of resources to different partitions. With this type of system, sub-processor partitioning may be applied. This type of partitioning allows for one physical processor to be mapped to multiple logical processors to support a larger number of logical processors than physical processor. In this manner, a larger number of partitions than physical processors may be supported.

In these illustrative examples, only a single partition is used. The mechanism of the present invention manages power consumption of processors in response to calls made by operating system 202 to partition management firmware 210. Operating system 202 sends a message or call to partition management firmware 210 when a logical processor may be unneeded for a period of time. These calls are those typically used with sub-processor partitioning in a logical partitioned platform in order to request or cede the use of a logical processor. With sub-processor partitioning, partition management firmware 210 is able to control the allocation or usage of individual processors for different partitions. With this type of partitioning, a processor may be allocated to more than one partition. In other words, this type of configuration allows for the implementation of a larger number of partitions than physical processors in the system.

The mechanism of the present invention uses this calling or messaging system to reduce power consumption and heat production in a manner transparent to programs executing in partition 203. Instead of allowing the processor to be used by another partition for the period of time when the processor is unneeded, the processor is placed into a power saving mode. The mechanism of the present invention does not require any particular type of power saving mode and may use any type of power saving mechanism.

In particular, operating system 202 may generate an idle call to partition management firmware 210. This call is a message including an amount of time for which a physical processor associated with a logical processor is to be ceded or is unneeded. Partition management firmware 210 may place the physical processor into a power saving mode in response to receiving an idle call from operating system 202. This power saving mode may include, for example, reducing the clock speed frequency or placing the processor into a sleep mode. When a processor is in a sleep mode, the entire processor is completely shut down with only the state of the processor being stored in a dynamic random access memory (DRAM) state for quick recovery. In this mode, the external processor bus clock is stopped.

In this manner, the mechanism of the present invention allows for a reduction in the use of power in a multi-processor data processing system by placing processors into a power saving mode when those processors are unneeded for some period of time. The mechanism of the present invention may be implemented with any operating system supporting partitioning because this mechanism is independent of any operating system support for reducing power usage. Further, the mechanism of the present invention has a minimal impact on performance because processors are placed into a power saving mode only when idle times are present.

Figure 3:
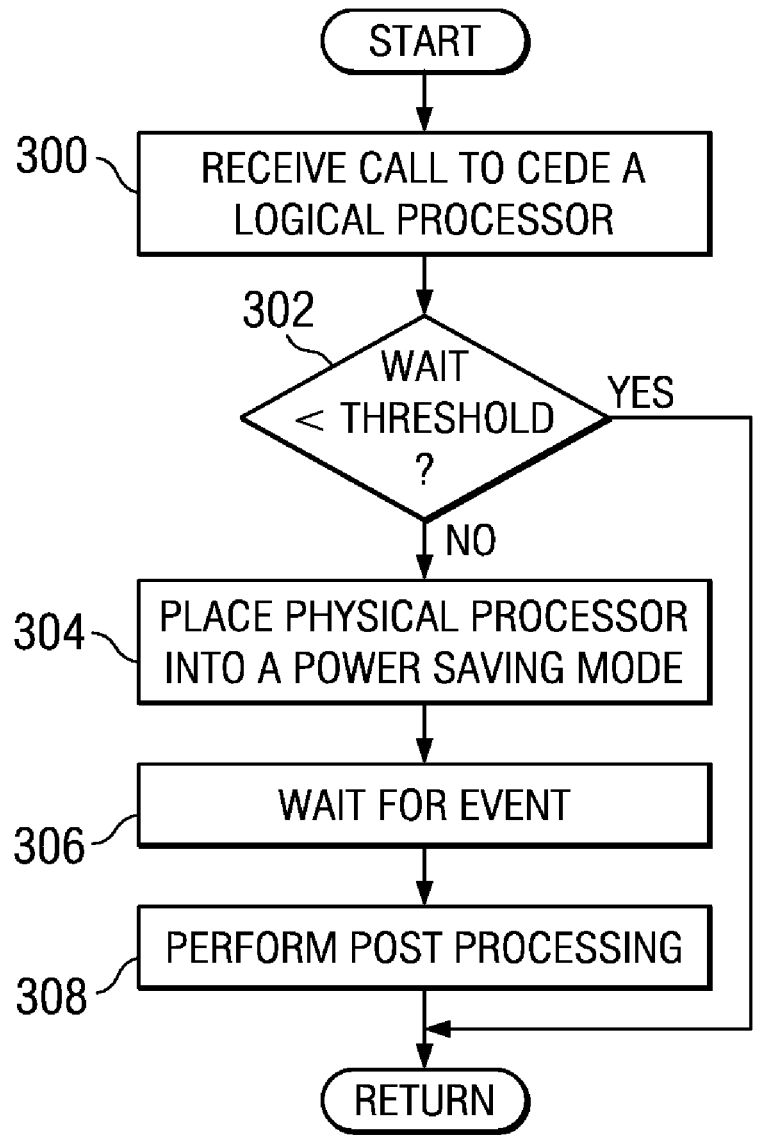
FIG. 3 is a flowchart of a process for managing processors in a logical partitioned data processing system in accordance with a preferred embodiment of the present invention.

Turning now to FIG. 3, a flowchart of a process for managing processors in a logical partitioned data processing system is depicted in accordance with a preferred embodiment of the present invention. The process illustrated in FIG. 3 may be implemented in a control process, such as partition management firmware 210 in FIG. 2. In these illustrative examples, this process is compared to a logical partitioned data processing system having only a single partition, such as logical partitioned platform 200 in FIG. 2. Of course, this mechanism also may be applied to systems with more than one partition.

The process begins by receiving a call to cede the logical processor (step 300). This call is received from an operating system and is normally generated when the operating system does not have a need for a logical processor. This call is also referred to as an idle call and includes an identification of the processor that is to be ceded as well as an amount of time for which the processor is to be ceded. In these examples, the mapping of processors is one logical processor to one physical processor. As a result, when a call is received from an operating system it is clear that the physical processor associated with the logical processor may be placed into a power saving mode.

Next, a determination is made as to whether a wait time during which the processor is unneeded is less than a threshold (step 302). The threshold may be selected based on the time needed to place the processor into a power saving mode and/or to return the processor to a normal mode of operation. If the wait time is not less than the threshold, the physical processor mapped to the logical processor is placed in a power saving mode (step 304). This power saving mode may take various forms, for example, the processor may be placed into a sleep mode, the clock speed may be reduced, or any other power reduction method or mechanism may be used. Other tasks may be performed to prevent the processor from being accessed while in the power saving mode. For example, interrupts for the processor may be disabled.

Thereafter, the processor waits for an event (step 306). The event may be an expiration of the time during which the processor is unneeded or ceded by the operating system. Additionally, the event also may be, for example, an indication or request for the logical processor by the operating system. After receiving the event, the post processing is performed (step 308), with control then returning to the caller. Post processing involves placing the physical processor back into the previous mode of operation as well as performing any tasks needed to allow for the processor to perform work or tasks. Referring back to step 302, if a wait threshold conditions are not met, the process also returns control to the caller without placing the processor into a power saving mode.

Thus, the mechanism of the present invention provides a method, apparatus, and computer instructions for reducing power consumption in a multi-processing data processing system. The mechanism of the present invention is implemented in these illustrative examples in a single or multi-processor data processing system in which a control program is present for managing one or more partitions. In this type of system, an operating system generates a call to the control program when a logical processor is unneeded by the operating system for some selected period of time. In response to this call, the physical processor mapped to the logical processor is placed in a power saving mode until some selected event, such as an expiration of a selected period of time, occurs. In this manner, power usage is reduced during idle time for a processor. This mechanism avoids or minimizes performance degradation because only idle times are used.

Although the illustrative examples are directed towards a logical partitioned data processing system having only a single partition, the mechanism of the present invention may be applied to multiple partitions by recording the fact that the processor is in a sleep mode and is therefore not available to participate as an active processor until the event is received to restore the processor to full operating mode.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a set of processors, the method comprising:
    receiving a call from an operating system, wherein the call indicates that a selected processor in the set of processors is unneeded for a period of time that is included in the call from the operating system, wherein the call is a sub-processor partitioning call sent from one of a plurality of different operating systems which are each executing in a respective partition of a multi-partitioned data processing system, where each partition of the multi-partitioned data processing system is managed by a runtime abstraction layer and (i) is assigned a non-overlapping subset of resources of the data processing system, and (ii) can be individually booted and shut down without having to power-cycle entirety of the data processing system; and
    altering operation of the selected processor to reduce power usage during the period of time, wherein the receiving step and the altering step are performed by the runtime abstraction layer that receives the call from at least one of a plurality of operating systems that are concurrently executing in the data processing system.

2. The method of claim 1, wherein the period of time is specified in the call from the operating system and is a time during which idle cycles are present for the selected processor.

3. The method of claim 1, wherein the selected processor is in an original state prior altering operation of the selected processor and further comprising:
    returning the selected processor to the original state after the period of time has elapsed.

4. The method of claim 3 further comprising:
    returning the selected processor to the original state if the period of time has not elapsed and an external interrupt indicating work is present for the selected processor is received.

5. The method of claim 1, wherein the altering step comprises:
    reducing a clock speed of the selected processor.

6. The method of claim 1, wherein the altering step comprises:
    placing the selected processor in a sleep mode if the period of time is greater than a predetermined threshold.

* * * * *